(12) United States Patent
Kirma (10) Patent No.: US 7,681,585 B2
(45) Date of Patent: *Mar. 23, 2010

(54) ARRANGEMENT FOR STORING AND CONVEYING LIQUID, ESPECIALLY IN AN AIRCRAFT

(75) Inventor: Safa Kirma, Wedel/Holstein (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/384,986

(22) Filed: Apr. 9, 2009

(65) Prior Publication Data

US 2009/0199920 A1 Aug. 13, 2009

Related U.S. Application Data

(60) Continuation of application No. 11/491,381, filed on Jul. 20, 2006, now Pat. No. 7,537,021, which is a division of application No. 10/658,685, filed on Sep. 8, 2003, now Pat. No. 7,100,640.

(30) Foreign Application Priority Data

Sep. 7, 2002 (DE) ................. 102 41 522

(51) Int. Cl.
*B60P 3/00* (2006.01)
(52) U.S. Cl. ..................... 137/266; 137/899.2
(58) Field of Classification Search ................. 137/266, 137/899.2, 561 A, 561 R, 259, 263; 285/405; 403/335; 220/4.27; 141/103–105
See application file for complete search history.

(56) References Cited

U.S. PATENT DOCUMENTS

| | | | |
|---|---|---|---|
| 1,335,093 A | 3/1920 | Copetta | |
| 1,668,179 A | 5/1928 | Williams | |
| 2,341,044 A | 2/1944 | Jackson et al. | |
| 2,395,802 A | 3/1946 | Bramson | |
| 2,939,727 A | 6/1960 | Allen et al. | |
| 3,044,666 A | 7/1962 | Dyer | |
| 3,093,397 A | 6/1963 | Yancey | |
| 3,645,415 A | 2/1972 | Phelps | |
| 3,771,817 A | 11/1973 | Schnabel | |
| 5,563,374 A | 10/1996 | Hubert | |
| 6,238,546 B1 | 5/2001 | Knieper et al. | |
| 6,682,108 B1 | 1/2004 | Arch | |
| 7,100,640 B2 * | 9/2006 | Kirma ..................... | 137/899.2 |

(Continued)

FOREIGN PATENT DOCUMENTS

DE 1 165 357 3/1964

(Continued)

*Primary Examiner*—John Rivell
*Assistant Examiner*—Craig M Schneider
(74) *Attorney, Agent, or Firm*—W. F. Fasse; W. G. Fasse (57) ABSTRACT

At least one liquid tank has an outlet opening and a drain stub extending therefrom. A circular flange has plural connection openings with connection stubs respectively extending therefrom. A drain line is connected to the circular flange and communicates with all of the connection stubs. The drain stub of each tank is flange-connected to a respective connection stub extending from the circular flange. Unneeded connection stubs can be closed with blind flanges. This provides a modular reconfigurable system allowing a selected plurality of liquid tanks to be connected to a single drain line through the flange arrangement.

17 Claims, 5 Drawing Sheets

U.S. PATENT DOCUMENTS 7,537,021 B2 * 5/2009 Kirma ..................... 137/266

FOREIGN PATENT DOCUMENTS

| | | |
|---|---|---|
| DE | 43 21 162 | 1/1995 |
| DE | 43 36 256 | 4/1995 |
| GB | 754708 | 8/1956 |
| JP | 2000-125458 | 4/2000 |

* cited by examiner

ARRANGEMENT FOR STORING AND CONVEYING LIQUID, ESPECIALLY IN AN AIRCRAFT

CROSS-REFERENCE TO RELATED APPLICATION

This application is a Continuation of U.S. application Ser. No. 11/491,381, filed on Jul. 20, 2006, now U.S. Pat. No. 7,537,021, issued on May 26, 2009, which is a Divisional of U.S. application Ser. No. 10/658,685, filed on Sep. 8, 2003, now U.S. Pat. No. 7,100,640, issued on Sep. 5, 2006. The entire disclosures of both prior applications are incorporated herein by reference.

PRIORITY CLAIM

This application is based on and claims the priority under 35 U.S.C. 119 of German Patent Application 102 41 522.6, filed on Sep. 7, 2002, the entire disclosure of which is incorporated herein by reference.

FIELD OF THE INVENTION

The invention relates to an arrangement of one or more liquid storage containers or tanks, as well as liquid conveying lines such as pipes, for storing and conveying liquid, for example fresh water or waste water in an aircraft.

BACKGROUND INFORMATION

Conventional passenger aircraft, for example Airbus aircraft such as the Airbus A340 aircraft, include an arrangement of waste water tanks, waste water drain lines, and various connections, couplings and other accessories for installing the tanks and the drain lines in the below-deck space of the aircraft fuselage, and connecting the tanks to the toilets, on-board galleys and the like, for receiving and storing the waste water generated by the toilets, galleys, and the like. The installation and connection of these tanks and drain lines is quite complicated and time consuming. Furthermore, since the available installation space is quite limited and tight, and it is necessary to install up to three waste water tanks of relatively large volume in the available tight space, it is already quite difficult simply to transport and position the tanks at the intended installation location.

Furthermore, the complete waste water tank system comprises a rather great number and variety of different connection parts, mounting parts, heatable pipe sections and pipe joints, and various other unwieldy installation components, mounting brackets, securing devices and the like, of relatively complex configuration. A separate waste water drain line or pipe is connected respectively to each one of the waste water tanks, and these drain lines are connected to a pipe junction. From there, a main drain line conveys the waste water drained out of the waste water tanks to its intended location, for example to be emptied out of the aircraft through a drain mast connected to the main drain line. The drain lines and drain connections arranged below the tanks are rather costly, complex in configuration with numerous branching locations and joints, and are thus quite subject to disruption or damage leading to waste water leakage, and generally causing problems in the installation and maintenance of the overall system in the rather tight available space.

Figure 1:
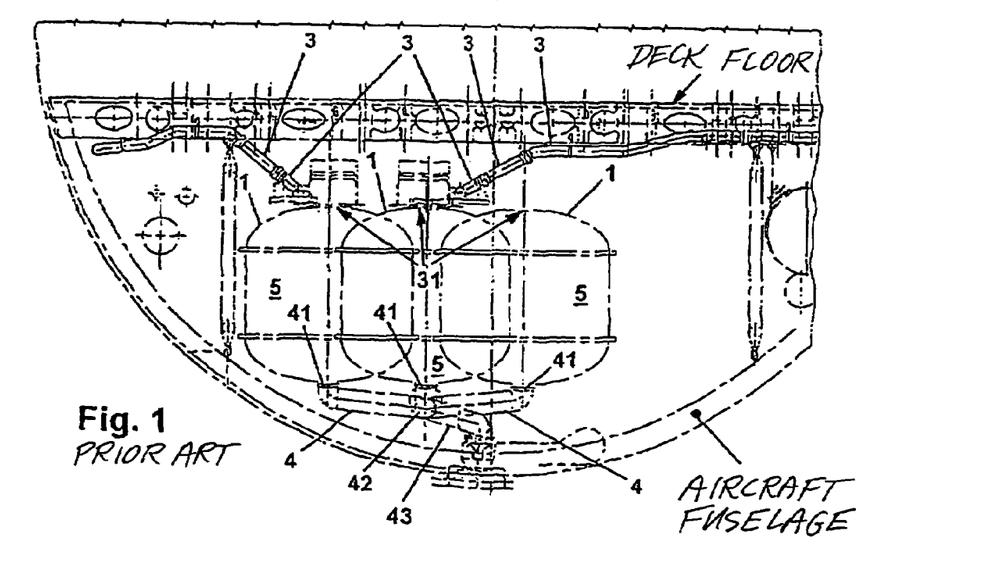
FIG. 1 is a schematic ghost front elevation view of a conventional waste water storage and conveying system arranged in the below-deck space in a passenger aircraft.

FIG. 1 of the present application schematically illustrates an example of a conventional arrangement of maximally three liquid storage containers or tanks 1 arranged in the below-deck space of a conventional aircraft such as an Airbus aircraft. Each one of the tanks 1 is a substantially cylindrical shaped tank with a complete circular cross-section (not shown in the vertical section of FIG. 1), and has a rather large volume capacity for storing liquid 5, such as accumulated waste water. The plural tanks 1 are arranged adjacent one another at the corners of a triangle clustered symmetrically around a vertical or upright axis (not shown).

These tanks 1 are connected to the various toilets, galleys, and the like in the aircraft by suitable water inlet or supply lines 3 such as waste water pipes that are connected to respective inlet openings 31 provided in the tops of the respective liquid tanks 1. These water lines or pipes 3 run below the aircraft deck floor that separates the passenger cabin and the like from the below-deck space inside the fuselage. The liquid 5, for example the waste water arising in the on-board galleys and the toilets, is transported by suction through a respective one of the water inlet lines 3 to a respective individual liquid tank 1, which is de-pressurized to a certain vacuum or negative pressure, for example by any conventional suction or vacuum source (not shown).

Furthermore, a respective drain or outlet line 4 is connected individually to a drain or outlet opening 41 provided at the center of the bottom of each individual tank 1. Thus, three individual drain or outlet lines 4 are connected to the three individual tanks 1, and all of these drain lines 4 must be arranged to have the required slope for achieving a proper liquid drainage. These plural drain lines 4 extend and are connected to a pipe branch junction 42 that leads to a further drain line 43 and that is arranged below the floor level of the several tanks 1 generally centered among the tanks along the vertical upright axis extending centrally between the tanks. All of these drain lines must be heated by suitable heating elements, such as electrical heating conductors, so as to prevent a freezing of the waste water or an icing of the drain lines during flight operation of the aircraft.

As generally discussed above, the conventional water storage tank arrangement suffers many problems and disadvantages, including a rather high complexity, a rather difficult and time-consuming installation, a great variety of different pipes, connectors, and other components, and a great difficulty of arranging the drain pipes and the necessary pipe junction in the small available space below the tanks. Furthermore, in the event of a leak or the like, it is extremely difficult to exchange a defective tank, pipe component, pipe coupling, or the like, which greatly increases the costs of on-going maintenance and repair. Furthermore, it is essentially impossible to expand the total liquid storage capacity of the installed system, because it is not economically practical to install any additional tank or tanks in the small available space if requested by the aircraft customer.

SUMMARY OF THE INVENTION

In view of the above, it is an object of the invention to provide an arrangement or system for storing and conveying liquid in a passenger aircraft, especially as a fresh water storage and supply system or as a waste water drain and storage system, which is improved so as to simplify the installation and assembly thereof, and especially to simplify the arrangement of the outlet lines thereof. It is a further object of the invention to reduce the total number and variety of required connecting parts and connecting pipe sections, while avoiding or minimizing the unwieldy handling of these installation and mounting parts. The invention further has the object of providing a liquid storage system that is easily adaptable and reconfigurable to be arranged in different available installation spaces in different aircraft, and to accommodate different required liquid storage volumes. Particularly, the inventive arrangement shall provide a building block system that can easily be adapted to various different aircraft types. Still another object of the invention is to reduce the installation and assembly complexity, costs, and efforts, while also reducing the total space consumption of the arrangement in comparison to the prior art. The invention further aims to avoid or overcome the disadvantages of the prior art, and to achieve additional advantages, as apparent from the present specification.

The above objects have been achieved according to the invention in an arrangement for storing and conveying liquid, comprising: at least one liquid storage tank or container with an inlet opening in a top thereof and an outlet opening in a bottom thereof; a pipe-shaped drain stub connected to and extending from the outlet opening; a partial flange, preferably having the shape of a sector of a circle, connected to a free end of the drain stub; at least one complementary flange arranged adjacent to and complementing the partial flange so as to form therewith a first circular flange; a second circular flange that lies surfacially against and is secured to the first flange; and a drain or outlet line such as a drain pipe connected to the second circular flange so as to be in liquid communication with the at least one drain stub connected to the second circular flange via the respective partial flange. Preferably, the outer diameters of the first circular flange and the second circular flange are the same, and the circular centerpoints of these two flanges are also coincident.

The at least one complementary flange complementing the partial flange to make up the first circular flange may be another partial flange (with a liquid throughflow hole or passage) or may be a blind or blank flange or cover plate (without a throughhole or passage). Each partial flange has an opening therein, to allow the liquid communication from the drain stub of the liquid container, through the opening of the connected partial flange of the first circular flange, and then through a corresponding opening of the second circular flange, into the connected drain line. On the other hand, the blind flange does not have an opening therein, but rather acts as a blank or blind component or cover plate to complement the partial flange or partial flanges to form therewith a complete circular configuration of the first circular flange. Thereby, the at least one blind flange also covers, closes-off and seals the portion of the underlying second circular flange that is not covered by the adjacent partial flange or flanges.

With the inventive arrangement, it is easily possible to connect one, two, three, four, or even more tanks via respective associated connected partial flanges, to the same common single second circular flange, which thereby connects the plural tanks to the single drain or outlet line. For this purpose, the second circular flange has a number of throughholes therein corresponding to the maximum possible number of tanks to be connected, and further has a reducer funnel or plenum space communicating all of these throughholes with the single drain line. The blind flange then covers and closes the unneeded throughholes of the second circular flange when fewer than the maximum number of tanks are to be connected. Further in this regard, each partial flange may be a one-half-flange with a one-half-circular sector shape, a one-third flange with a one-third-circular sector shape, or a one-quarter-flange with a one-quarter-circular sector shape for example. Similarly, each blind flange may have a shape corresponding to a one-half-circular sector, a one-third-circular sector, a two-thirds-circular sector, a one-quarter-circular sector, or a three-quarters-circular sector.

The selection of the flanges corresponds to the number and arrangement of the single tank or plural tanks to be connected to the second circular flange and thereby to the single drain or outlet line. Furthermore, each tank preferably has a configuration substantially corresponding to a one-half-cylinder, a one-third-cylinder, or a one-quarter-cylinder, with one convex generally cylindrical curved outer wall and one or two generally flat or planar outer walls, whereby the transition from the convexly curved outer wall to the flat planar wall or walls is not a sharp intersecting edge, but rather a rounded edge. With such a configuration, two, three or four tanks can be arranged together about a common central upright axis so as to together take up a cylindrical space about this upright axis. Alternatively, fewer than the complete complement of tanks can be arranged in this manner, while leaving an unused space making up one-quarter, one-third, one-half, two-thirds, or three-quarters of the complete cylindrical space about the common upright axis.

In an alternative embodiment, each tank itself may have a substantially cylindrical configuration, and a plurality of such cylindrical tanks may be arranged around the upright axis extending vertically centrally through the first circular flange and second circular flange. It is simply necessary that the drain or outlet opening of the tank is provided sufficiently close to the side of the tank adjacent to the upright axis so as to overlap onto the first and second circular flanges therebelow, whereby the drain stub can extend vertically down from the outlet opening to the flange therebelow. Alternatively, the drain stub extends at a slope from the tank to the centrally arranged flanges, which may then have a diameter smaller than the lateral dimension of a clear space between the tanks along the upright axis.

According to a further embodiment, a 360° circular drain flange (instead of the above mentioned partial flange) is connected to the individual drain stub at the outlet end thereof, and further a 360° circular connection flange is connected to this drain flange, and has an individual connection stub joined thereto and extending therefrom. The connection stubs are all joined to a single common circular flange, which further communicates through a reducer funnel or the like into the single drain line. Respective single openings are provided in the drain and connection flanges to form a flow-through communication from the drain stub to the connection stub and from there through the circular flange and funnel into the drain line. These flanges may be connected to each other with a pipe clamp or hose clamp or the like.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

FIGS. 2 to 18C illustrate various features and embodiments of an arrangement according to the invention for storing and conveying liquid 5, that share certain components and similarities with the conventional arrangement discussed above in connection with FIG. 1. Components of the inventive arrangements that are related or similar to components of the conventional arrangement discussed above will be identified with the same reference numbers as in FIG. 1.

Particularly, FIGS. 2 to 18C show components of a single cluster of one or more liquid containers or tanks 1 that are connected to at least one waste water inlet line 3 in the below-deck space of a passenger aircraft. It should be understood, that the overall arrangement or system according to the invention can be expanded by providing a plurality of such groups or clusters of the liquid tanks 1 at successive locations along the longitudinal length in a high capacity or large volume aircraft or in a passenger aircraft based on a stretched version of a basic fuselage. The liquid tank or tanks 1 are connected to especially a single waste water drain or outlet line 4 through a special flange connection arrangement according to the invention as will be discussed in detail herein.

This clustered arrangement of the liquid tanks 1 is especially made possible by using liquid tanks 1 with an external configuration different from the conventional cylindrical tank configuration of FIG. 1, whereby the inventive tank configuration is especially an irregular or non-rotationally-symmetrical configuration. For example, each liquid container 1 can have the general configuration of a one-half tank 11 (i.e. a configuration of a one-half cylinder), or a one-third-tank 12 (i.e. a configuration of one-third of a cylinder), or a one-quarter-tank 13 (i.e. a configuration of one-quarter of a cylinder).

Generally, an example embodiment of an arrangement according to the invention for storing and conveying liquid 5 comprises at least one liquid container 1, having an inlet opening 31 in the container top thereof, and a drain or outlet opening 41 in the container bottom or floor thereof. Preferably, the drain or outlet opening 41 is offset from the center of the bottom of the liquid container 1, but rather is positioned close to a side edge of the bottom of the container 1. A pipe-shaped drain stub 2 is connected to the drain opening 41, and this drain stub 2 is connected via the special inventive flange arrangement to a pipe-shaped drain line 4 for conveying away the liquid 5 that has been received and stored in the liquid container 1.

In this regard, a partial flange 7 is connected or joined to the stub outlet end of the drain stub 2, whereby preferably the back side of this partial flange 7 is integrally formed onto the outlet end of the drain stub 2 oriented away from the container 1. At least one complementary flange adjoins and complements this partial flange 7 so as to form therewith a first complete circular flange 9. Preferably, the partial flange 7 and each complementary flange respectively has a circular sector shape so that the several circular sectors complement each other to form the complete circular flange 9.

The at least one complementary flange may include another partial flange with a flow-through opening (like the partial flange 7) for another liquid container 1, and/or may include a blind flange or blank flange 8 that is not connected to another liquid container 1 and that does not have a liquid flow-through opening therein. In the simplest embodiment having only a single liquid container 1, the first circular flange 9 will be made up of a single partial flange 7 and a single blind flange 8 that complements the partial flange 7 to form the complete circular shape of the first circular flange 9.

This multi-part first circular flange 9 lies on and is sealed and secured against a second circular flange 10. The two flanges 9 and 10 thus lie parallel to each other, and in contact with one another along the opposed end surfaces thereof. The flanges are secured together with any suitable securing means (e.g. bolts, clamps, latches, brackets, toggles, etc.). The above mentioned drain line or pipe 4 is connected to the bottom or back surface of the second circular flange 10, e.g. which may involve a reducer funnel or plenum chamber. The drain line 4 is embodied as a pipe, whereby the outer diameter of the drain line 4 may correspond to or be smaller than the outer diameter d of the first and second circular flanges 9 and 10. The circle midpoint or centerpoint KMP of the flange surfaces of both of the two circular flanges 9 and 10 coincides with that of the cross-section of the drain line 4.

In arrangements including a plurality of liquid containers 1, the containers 1 are all arranged adjacent to and grouped around a vertical fictitious upright axis 14 that extends through the circular midpoint or centerpoint KMP of the flanges 9 and 10. In such an arrangement with plural liquid containers 1, there is a corresponding number of the partial flanges 9 respectively associated with the containers 1, with or without one or more further blind flanges 8 as necessary to complement the partial flanges to form the complete circular shape of the first circular flange 9. Each one of the first and second circular flanges 9 and 10 is thus a circumferentially complete and continuous 360° circular shaped flange, without any missing sectors or notches or the like. The second circular flange 10 is a single-piece circular flange, while the first circular flange 9 is a multi-part flange made up of one or more partial flanges 7 and one or more complementary blind flanges 8.

The drain opening 41 of each tank is arranged in the container floor 6 of the respective tank, at a location displaced away from the center of the container floor 6, particularly in a floor area of the container floor 6 lying adjacent to the side of the container 1 oriented toward the above-mentioned vertical upright axis 14 around which the containers 1 are clustered.

As mentioned above, each individual liquid container 1 may have the configuration of a so-called one-half-tank 11 (with a one-half-cylindrical shape), or a one-third-tank 12 with a one-third-cylindrical shape), or a one-quarter-tank 13 (with a one-quarter-cylindrical shape). Each such liquid container 1 or tank 11, 12 or 13 comprises a container outer wall 16 including a convexly curved outer wall portion 15 extending substantially along a cylindrically curved arc segment, and either one (in the case of a one-half-tank 11) or two (in the case of a one-third-tank 12 or a one-quarter-tank 13) substantially flat planar outer wall portions 18 to which the convexly curved wall portion 15 is joined to form the complete outer wall 16 of the container 1. The convexly curved wall portion 15 does not join the flat planar wall portion or portions 18 at a sharp angled edge, but rather along a smoothly curved junction area, as is apparent in each of the FIGS. 3 to 11. These shapes are selected to achieve a strong self-supporting configuration so that the respective container 1 can be operated as a vacuum tank as discussed above, without danger of the container outer wall 16 collapsing. In this regard, it should also be noted that the substantially flat planar wall portion 18 can actually be provided with a slight concave curvature 18' (e.g. as visible in FIG. 2) to avoid collapsing or indenting of this flat planar wall portion 18 when the container 1 is subjected to an internal vacuum.

With such a configuration of each individual one-half-tank 11, one-third-tank 12, or one-quarter-tank 13, a plurality of such tanks can be arranged around the above-mentioned vertical upright axis 14, namely with the cylindrically curved wall portion 15 of each tank arcing about a centerpoint arranged essentially at or directly adjacent to the upright axis 14, with the several tanks adjacent to one another. Thus, two one-half-tanks 11, or three one-third-tanks 12, or four one-quarter-tanks 13 can be arranged in this manner to form a substantially complete cylindrical shape coaxially centered on the vertical upright axis 14. If a lesser volume storage capacity is required, then one or more of the tanks can also be omitted, to form a partial-cylindrical overall configuration.

As generally mentioned above, the first circular flange 9 is made up of at least one partial flange 7 and at least one complementary flange which may be at least one additional partial flange 7 and/or at least one blind flange 8, which complement one another to form a complete circular shape of the first circular flange 9. The particular shape of each partial flange 7 and/or blind flange 8 depends on the shape or configuration of, or the intended number of, the respective associated liquid containers 1. For a one-half-tank 11, the partial flange 7 is configured as a one-half-flange 71 having a one-half-circular shape. For a one-third-tank 12, the partial flange 7 is configured as a one-third-flange 72 having the shape of a one-third-sector (120°) of a circle. For a one-quarter-tank 13, the partial flange 7 is configured as a one-quarter-flange 73 having the shape of a one-quarter-sector (90°) of a circle. Correspondingly, in order to complement the one or more partial flanges 7, depending on the number and configuration of the liquid containers 1, the blind flange or flanges 8 is or are provided in the configuration of a one-half blind flange 81 (with a one-half-circle sector shape), a one-third blind flange 82 (with a one-third-circle sector shape), a two-thirds blind flange 83 (with a two-thirds-circle sector shape), a one-quarter blind flange 84 (with a one-quarter-circle sector shape), or a three-quarters blind flange 85 (with a three-quarters-circle sector shape). The flange edges of the complementary flanges, i.e. the partial flange 7 and the blind flange 8, to form the complete first circular flange 9, are configured and arranged in an exactly fitting manner, and can be simply butted against one another, with or without a seal therebetween, or can be shaped in a respective form-fitting or form-interlocking manner to engage with one another.

Each individual partial flange 7 has a respective single flange opening therein, which is connected to and communicates with the bottom or outlet end of the respective associated drain stub 2. Correspondingly, the second circular flange 10 has a respective associated flange opening below each one of the partial flanges 7 lying surfacially thereon, with a flange seal arranged between the circular flange 9 and the circular flange 10. This flange seal also has a throughhole or opening corresponding and aligned with each of the flange openings of the respective partial flanges 7. The respective openings in a partial flange 7, the flange seal, and the second circular flange 10 are aligned with one another along the axis of the associated drain stub 2, so as to form a continuous liquid flow passage through this flange arrangement that is sealed by the flange seal. On the other hand, the blind flange or flanges 8 do not have liquid throughflow openings, and instead form a solid cover over a portion of the underlying second circular flange 10 that is not to be connected to associated liquid containers 1. Since the single drain line or pipe 4 is connected to the bottom of the second circular flange 10, this arrangement serves to connect a plurality of liquid containers 1, through plural associated drain stubs 2, via the plural associated partial flanges 7, with the throughflow openings communicating through the second circular flange 10, into the single drain line 4.

It should further be made clear that the drain line 4 is preferably embodied without branches or junctions, but instead leads directly to a drain line system that conveys the drained liquid 5, for example, to a drain mast of the aircraft (not shown) from which the liquid may be drained.

A further embodiment according to the invention uses liquid containers 1 with a generally cylindrical shape, as illustrated in FIGS. 12 to 15. The plural cylindrically shaped liquid containers 1, i.e. cylindrical tanks 19, are arranged clustered about the vertical upright axis 14 so that the container outer wall 16 of each individual tank 19 contacts or is arranged very close to the container outer wall 16 of at least one adjacently positioned cylindrical tank 19. In this manner, 2, 3, or 4 tanks may be clustered as closely or densely as possible about the vertical upright axis 14 extending through the circular middle or centerpoint KMP of the flange arrangement located below and connected to the cylindrical tanks 19.

Figure 15:
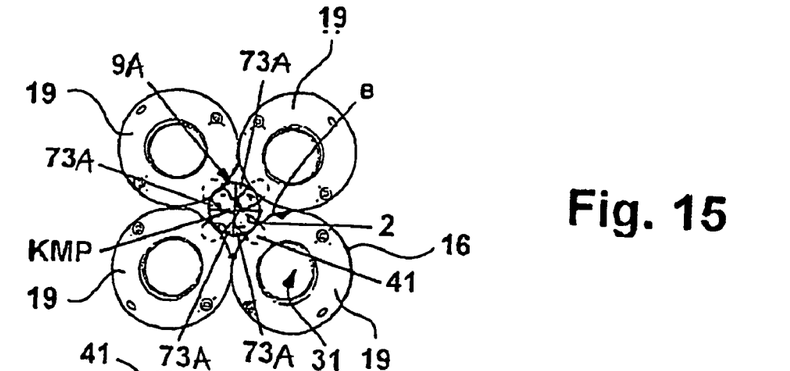
FIG. 15 is a top view of an arrangement including four cylindrical tanks arranged adjacent one another similar to FIG. 14, but with a different embodiment of the flanges and drain connection at the bottom of the tanks.

In this context, as shown in the alternative embodiment of FIG. 15, it is also possible to arrange the drain opening 41 extending and sloping downwardly at an angle in a direction toward the upright axis 14 through the respective container floor 6, so that the drain stub 2 connected thereto extends at a sloping angle toward the circular middle or centerpoint KMP to be connected to the associated individual partial flange 7 close to this centerpoint KMP. With this arrangement, the first circular flange 9A according to FIG. 15 is formed or assembled together of plural partial flanges 7 and particularly one-quarter-flanges 73A having a smaller radius than the flanges used in the other embodiments, which have a radius large enough to extend outwardly and overlap under the lateral dimension of the floor of the respective tanks.

Figure 2:
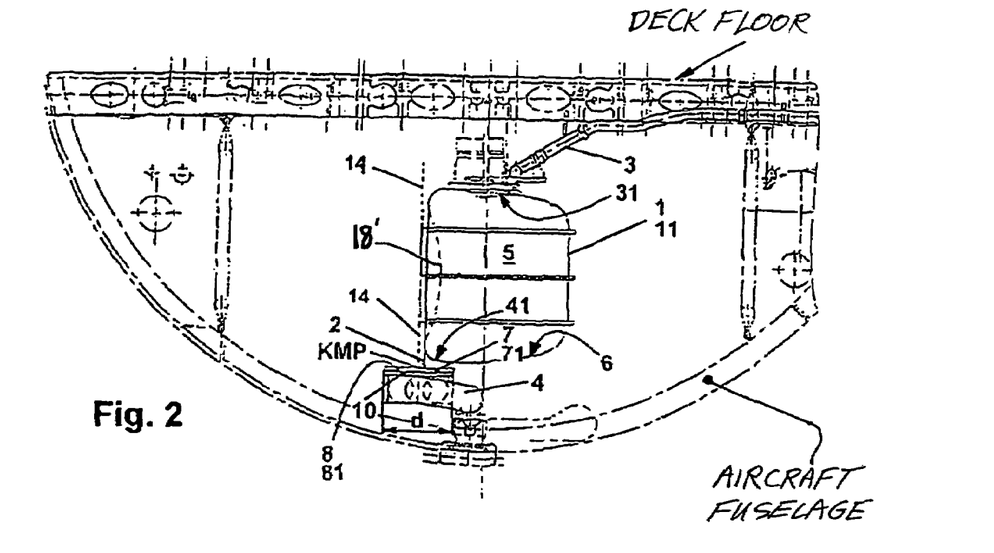
FIG. 2 is a schematic ghost front elevation view of a simple embodiment of a waste water storage and conveying system according to the invention including only one tank, installed in the below-deck space of a passenger aircraft.
Figures 3, 4, 6, 7, 10, 11:
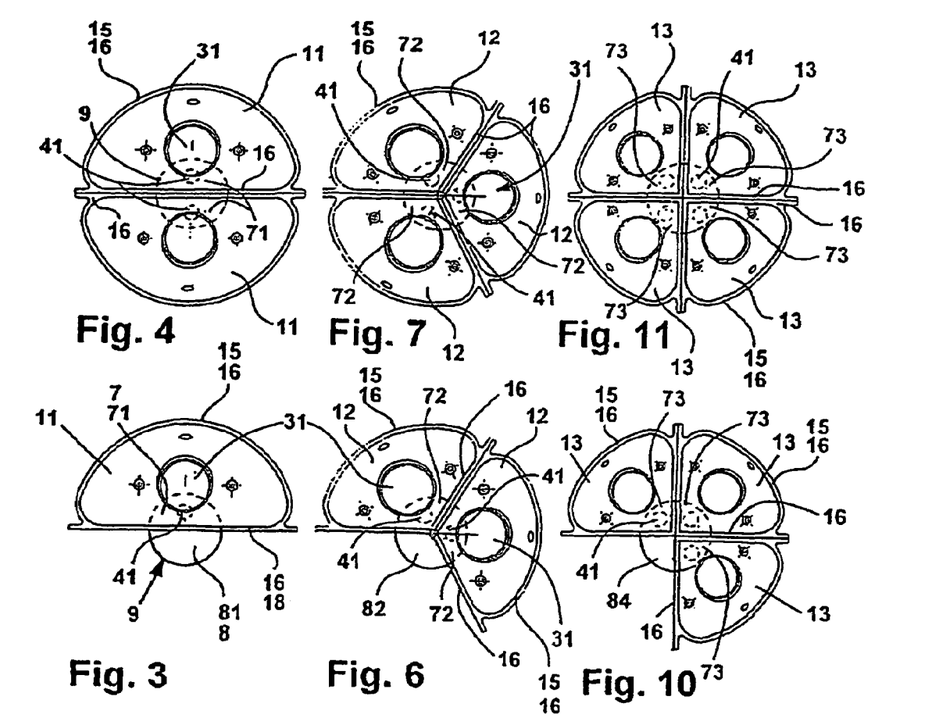
FIG. 3 is a top view of the waste water storage tank arrangement according to FIG. 2, with a one-half tank, i.e. a tank with a one-half-cylindrical configuration.
FIG. 4 is a top view of an arrangement including two one-half tanks arranged to complement one another.
FIG. 6 is a top view of an arrangement including two one-third-tanks arranged adjacent one another.
FIG. 7 is a top view of an arrangement using three one-third-tanks arranged adjacent one another.
FIG. 10 is a top view of an arrangement including three one-quarter-tanks arranged adjacent one another.
FIG. 11 is a top view of an arrangement including four one-quarter-tanks arranged adjacent one another.

An embodiment of the invention using semi-cylindrical tanks, or so-called one-half-tanks 11, will now be described in detail with reference to FIGS. 2 to 4. This arrangement may include either one one-half-tank 11 as shown in FIGS. 2 and 3, or two one-half-tanks 11 as shown in FIG. 4. Particularly, FIG. 2 shows a front elevation view of a single one-half-tank 11 in its final installed condition. The one-half-tank 11 is located in the below-deck space of an aircraft, and is connected to a waste water pipe as an inlet or supply line 3, which is connected to the inlet opening 31 provided in the top of the tank 11, so that a liquid 5 and particularly the waste water is conveyed into the tank 11. After the waste water 5 has been temporarily stored in the tank 11, it may be drained through the drain stub 2 that is connected to the drain or outlet opening 41 in the tank or container floor 6. The drain stub 2 in turn is connected to or integrally formed with the one-half flange 71, in the manner as generally discussed above.

In this arrangement with only a single one-half-tank 11, there is a corresponding associated one-half-flange 71, which is complemented by a single one-half-blind flange 81 to form the complete first circular flange 9 of these two one-half-flanges. This first circular flange 9 is arranged on the second circular flange 10, with a suitable flange seal arranged therebetween, and then the two flanges are secured to each other with any suitable means, such as bolts, clamps, toggles, or the like. As can be seen in FIG. 2, the diameter d is the same for both circular flanges 9 and 10, and can even be the same for the drain or outlet line 4 that is connected to the second circular flange 10. FIG. 2 also clearly shows the upright axis 14 extending vertically through the circle midpoint or centerpoint KMP of the two circular flanges 9 and 10, which is preferably also the centerpoint or axis of the inlet end of the drain line 4. The single one-half-tank 11 is arranged and positioned with its generally flat wall portion 18 of the container outer wall 16 extending along and adjacent to the upright axis 14. As also mentioned above, the flat wall portion 18 may actually have a slight concave curvature 18'.

Corresponding to FIG. 2, FIG. 3 shows a top plan view of the arrangement or installation of a single one-half-tank 11. The cross-sectional shape of the tank 11 has a generally semi-circular configuration bounded by the convexly curved wall portion 15 and the generally flat wall portion 18 making up the container outer wall 16. This cross-sectional shape could be regarded as similar to the cross-sectional shape of the top or cap of a mushroom, or like the sectional shape of a drop of liquid on a surface.

FIG. 4 shows a further embodiment using two back-to-back one-half-tanks 11, whereby the tanks are installed and connected to the single drain line 4 in a manner similar to that described above for the single one-half-tank 11 in connection with FIGS. 2 and 3. The two tanks are arranged with their respective substantially flat wall portions 18 contacting one another back-to-back along the upright axis 14, so that the two tanks 11 together make up a complete substantially cylindrical configuration. In order to connect the two tanks 11 to the second circular flange 10, there are two one-half-flanges 71, which together form the first circular flange 9 (rather than one one-half-flange 71 and one one-half-blind flange 81 as used in the arrangement of a single one-half-tank 11 in FIGS. 2 and 3).

Figures 5, 8, 9:
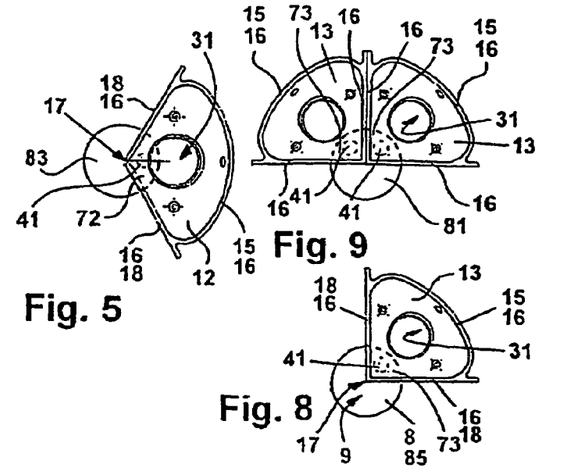
FIG. 5 is a top view of an alternative embodiment including a single one-third-tank, i.e. a tank having a configuration substantially corresponding to one-third of a cylinder.
FIG. 8 is a top view of an arrangement including a single one-quarter-tank, i.e. a tank having a configuration of one-quarter of a cylinder.
FIG. 9 is a top view of an arrangement including two one-quarter-tanks arranged adjacent one another.

A further embodiment according to FIGS. 5 to 7 uses one to three one-third-tanks 12 connected through a flange arrangement to a single drain line. The so-called one-third-tanks each have substantially a configuration of a one-third-sector of a cylinder, allowing for rounded corners or edges, a concavity on the otherwise flat sector sides, a convex curved side with a curvature that is not perfectly cylindrical, and the like. Thus, the cross-sectional shape of each tank 12 looks somewhat like the cross-sectional shape of a parachute canopy and shroud lines, including a convexly curved wall portion 15 and two generally flat wall portions 18 that meet each other along an angular edge 17 spanning an internal angle of the tank of 120°.

In this context, the top view of FIG. 5 shows a single one-third-tank 12 in its final installed condition. An inlet line 3 such as a waste water line conveys a liquid 5 such as waste water into this one-third-tank 12, for which this inlet line 3 (not shown) is connected to the inlet opening 31 provided in the top wall of the tank 12. The connection of the drain stub 2 to the drain or outlet opening 41 in the tank floor, and the pipe connection of the drain stub 2 to a one-third-flange 72 is carried out in the manner generally described above. Particularly, a one-third-flange 72, namely a flange having a circular sector shape spanning one-third or 120° of a complete circle, is connected or integrally formed on the outlet or downstream end of the drain stub 2. In this embodiment with only a single tank 12, there is only a single one-third-flange 72, which is complemented by a two-thirds blind flange 83 to form the first complete circular flange 9. A flange seal is positioned between the first circular flange 9 and the second circular flange 10, which are arranged one on another, and are then secured to one another. The above described edge 17 formed along the junction of the two generally flat wall portions 18 is positioned to extend along or near the upright axis 14 extending vertically through the circle midpoint or centerpoint KMP of the flanges.

FIG. 6 now shows an arrangement in which a second one-third-tank 12 has been added to the single one-third-tank 12 described above. The installation and connection of the second tank 12 is carried out in a manner similar to the first tank 12 as described above in connection with FIG. 5. Since this second one-third-tank 12 similarly is connected to its own associated one-third-flange 72, there are now a total of two one-third-flanges 72 in this arrangement, which are complemented by a one-third blind flange 82 to form the complete first circular flange 9 (rather than a two-thirds blind flange 83 in the single tank arrangement according to FIG. 5).

FIG. 7 shows an arrangement based on that of FIG. 6, except with a third one-third-tank 12 having been installed and added to the tank group or cluster about the upright axis 14. The installation and connection of this third one-third-tank 12 is carried out in a manner similar to that described above for the first one-third-tank 12 according to FIG. 5. Since the third one-third-tank 12 is connected to its own respective associated one-third-flange 72, it is no longer necessary to provide any blind flange 82, 83, because the three existing one-third-flanges 72 complement one another so as to together form the first circular flange 9.

A third embodiment of the invention as shown in FIGS. 8 to 11 uses one, two, three or four one-quarter-tanks 13 as the liquid containers 1. As seen in FIG. 8, the cross-sectional shape of a single one-quarter-tank 13 is generally similar to that of the one-third-tank 12 shown in FIG. 5, except that the two generally flat wall portions 18 of the tank wall 18 span an internal angle of 90° rather than 120°.

The top view of FIG. 8 shows a single one-quarter-tank 13 in the final installed condition. An inlet line 3 (not shown) such as a waste water line is connected to the inlet opening 31 provided in the top wall of the tank 13, so as to supply or convey the liquid 5 such as waste water into the tank 13. The connection of the drain stub 2 to the drain or outlet opening 41 located in the tank floor, and the pipe connection of the drain stub 2 to a one-quarter-flange 73, are carried out in the manner generally described above. Particularly, a one-quarter-flange 73, i.e. a flange having the shape of a one-quarter-circle or a 90° sector of a circle, is connected to or integrally formed on the outlet or downstream end of the drain stub 2. In this configuration with only a single one-quarter-tank 13, the single one-quarter-flange 73 is complemented by a three-quarters blind flange 85 so as to together form the complete first circular flange 9.

A suitable flange seal is arranged between the first circular flange 9 and the second circular flange 10, which two flanges are arranged one on the other and then secured to one another. The angular edge 17 formed by the junction of the two generally flat wall portions 18, and spanning an internal angle of 90°, is positioned to extend along or close to the upright axis 14 extending vertically through the circle midpoint or centerpoint KMP of the flanges.

FIG. 9 shows a further arrangement in which a second one-quarter-tank 13 has been added to the single one-quarter-tank 13 of FIG. 8. The installation and connection of the second one-quarter-tank 13 is carried out in the same manner as described above regarding the first one-quarter-tank 13 according to FIG. 8. Since the second one-quarter-tank 13 is connected to its own respective associated one-quarter-flange 73, there are now two one-quarter-flanges 73, which are complemented by a one-half-blind flange 81 instead of the three-quarters blind flange 85 according to FIG. 8, so as to together form the complete first circular flange 9.

To form the further varied arrangement according to FIG. 10, a third one-quarter-tank 13 has been added to the arrangement according to FIG. 9. The installation and connection of the third one-quarter-tank 13 is carried out in the same manner as described above regarding the single one-quarter-tank 13 according to FIG. 8. Since this third one-quarter-tank 13 is connected to its own associated one-quarter-flange 73, there are now three one-quarter-flanges 73, which are complemented by a one-quarter-blind flange 84, so as to together form the complete first circular flange 9.

In the arrangement as shown in FIG. 11, a fourth one-quarter-tank 13 has been installed and added to the arrangement according to FIG. 10, whereby the installation and connection of this fourth tank 13 is also carried out in the same manner as described above regarding the first or individual one-quarter-tank 13 according to FIG. 8. Since this fourth one-quarter-tank 13 is similarly connected to its own respective one-quarter-flange 73, there are now four one-quarter-flanges 73, which together make up the first circular flange 9, which thus no longer needs to be complemented by any blind flange 84.

A fourth embodiment of the invention is illustrated in FIGS. 12 to 15. This embodiment involves an arrangement of two, three, or four cylindrical tanks 19 as liquid containers 1. The cross-sectional shape of each one of these tanks 19 corresponds approximately to a circle.

Figure 12:
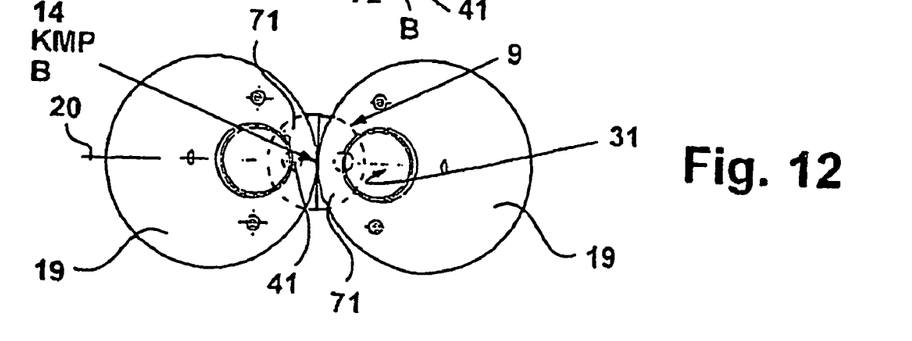
FIG. 12 is a top view of an arrangement including two cylindrical tanks arranged opposite and adjacent one another.

The top view of FIG. 12 shows an arrangement of two cylindrical tanks 19 in the final installed condition, whereby the container outer wall 16 respectively of each tank contacts the container outer wall 16 of the other tank at the contact area B along the vertical upright axis 14 passing through the circular midpoint or centerpoint KMP of the flange arrangement. These two cylindrical tanks 19 are arranged diametrically opposite one another along a diametrical line 20 that passes through the central axis of each respective cylindrical tank 19 and through the upright axis 14. Each one of the cylindrical tanks 19 is supplied with liquid 5 such as waste water through a respective inlet line 3 such as a waste water pipe (not shown). In this regard, the respective inlet line 3 is connected to an inlet opening 31 provided in the top of the respective tank 19. Furthermore, a drain stub 2 is connected to the drain opening 41 located in the floor of each tank 19, and the drain stub 2 is further connected to a one-half-flange 71 in the manner generally described above. The two one-half-flanges 71 respectively connected to the outlet ends of the drain stubs 2 of the two cylindrical tanks 19 complement each other so as to together form the first circular flange 9, without requiring any blind flange 8. The first circular flange 9 and second circular flange 10 are arranged surfacially one on the other with a flange seal therebetween, and are then secured to one another in the manner generally described above.

Figure 13:
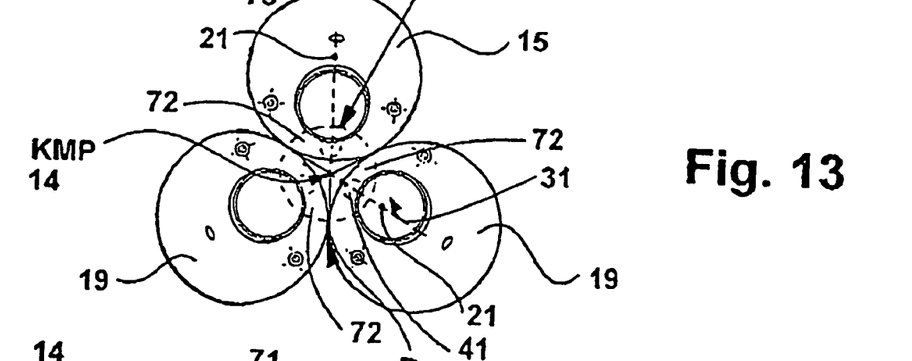
FIG. 13 is a top view of an arrangement including three cylindrical tanks arranged adjacent one another.

As shown in the top view of FIG. 13, a further arrangement includes three cylindrical tanks 19, of which the container outer walls 16 contact one another along contact areas B clustered around the vertically extending upright axis 14 in a triangular or close-packed circular configuration. In such an arrangement, a fictitious transverse extension or line 21 passing through the cylindrical axis of one of the tanks 19 and intersecting the upright axis 14, also passes through the contact area B between the tank outer walls 16 of the other two cylindrical tanks 19. Each one of these tanks 19 is connected to a respective inlet line 3 and supplied with liquid 5 such as waste water in the same manner as described above. Each one of these tanks is further connected to a drain stub 2 through a drain opening 41 provided in the tank floor, and the drain stub 2 is further connected to a respective one-third-flange 72 in the same manner as discussed above for the other arrangements. Thus, the three one-third-flanges 72 respectively connected to the three cylindrical tanks 19 via the respective drain stubs 2 complement one another so as to together form the complete first cylindrical flange 9, without requiring any blind-flange 8 to complete the circle. The first circular flange 9 is arranged on a second circular flange 10 with a suitable flange seal therebetween, and the two flanges are then secured to one another.

Figure 14:
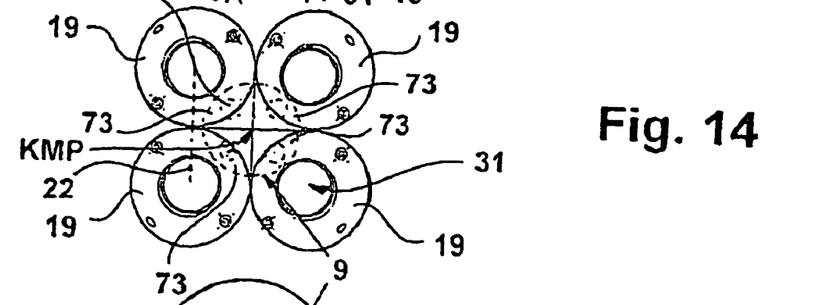
FIG. 14 is a top view of an arrangement including four cylindrical tanks arranged adjacent one another.

The arrangement shown in FIG. 14 is a further development including four cylindrical tanks 19 clustered in a square pattern about the vertical upright axis 14, so that the container outer walls 16 of the respective neighboring or adjoining tanks 19 contact each other along four contact areas B. With such an arrangement, a fictitious set of lines 22 extending between the cylindrical axes of each adjacent pair of the cylindrical tanks 19 will pass through the respective contact areas B and form a square pattern with the upright axis 14 at the center thereof. Just as described above for the other arrangements, these cylindrical tanks 19 are also each connected to a respective inlet line 3 such as a waste water line (not shown) so as to supply liquid 5 (such as waste water) through an inlet opening 31 provided in the top of the respective tank 19 into the tank 19. Each tank 19 is also connected via a drain stub 2 from a drain opening 41 provided in the tank floor to a respective connected one-quarter-flange 73. There are thus four one-quarter-flanges 73 respectively associated with and connected to the four cylindrical tanks 19 via the four drain stubs 2. These four one-quarter-flanges 73 complement one another so as to together form the complete first circular flange 9, without requiring any blind flange 8 to complement the one-quarter-flanges for forming a complete circle. The formed first circular flange 9 is arranged on a second circular flange 10 with a suitable flange seal arranged therebetween. The two circular flanges 9 and 10 are then secured to one another.

The arrangement of four installed cylindrical tanks 19 according to FIG. 15 is very similar to the arrangement illustrated and described above in connection with FIG. 14. The differences are as follows. In the arrangements of FIGS. 12 to 14, as also in the arrangements of FIGS. 2 to 11, the circular flanges 9 and 10 have a diameter that is large enough so that the lateral size or extension of the flanges extends under all of the tanks that are to be connected. Thereby, each drain stub 2 connected to the outlet opening in the floor of the respective tank at a location relatively close to the upright axis 14 can extend substantially vertically downwardly from the outlet opening 41 of the tank to the respective connected opening of the first circular flange. In contrast, in the arrangement according to FIG. 15, the flanges, and especially the first circular flange 19, have or has a diameter that is smaller than the diameter required to overlap or actually extend under the several cylindrical tanks 19. Thus, in order to connect the tanks 19 to the first circular flange, the outlet openings 41 and the drain stubs 2 connected thereto are oriented to slope at an angle generally inwardly toward the vertical upright axis 14 through and from the respective tank floor 6 of the respective associated cylindrical tank 19. Then, the outlet or downstream end of each drain stub 2 is connected to a respective associated individual one-quarter-flange 73A along the edge side thereof close to the circle midpoint or centerpoint KMP thereof. In this manner it is achieved that the one-quarter-flange 73A, and then the four one-quarter-flanges 73A making up the complete first circular flange 9 can be embodied with a smaller radius, for example in comparison to the one-quarter-flange 73 according to FIG. 14.

Figures 16, 17:
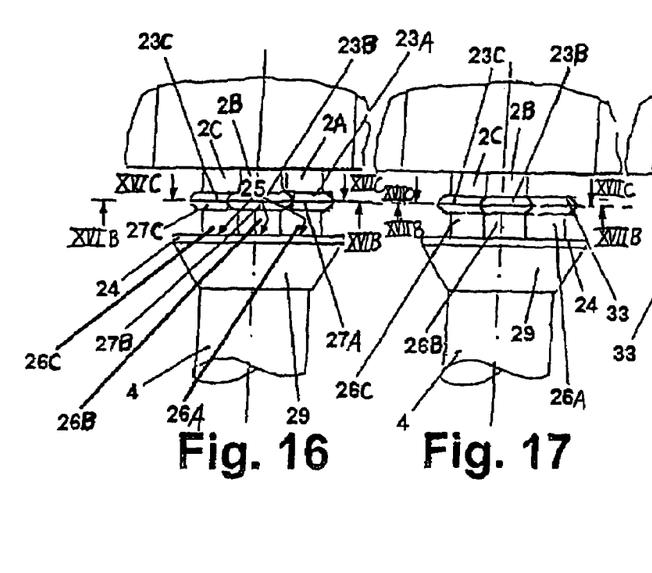
FIG. 16 is a side view of the connection area of an arrangement including three one-third-tanks connected to a single drain or outlet line.
FIG. 17 is a side view similar to FIG. 16, but showing an arrangement including only two interconnected one-third-tanks.
Figures 16A, 17A, 18A:
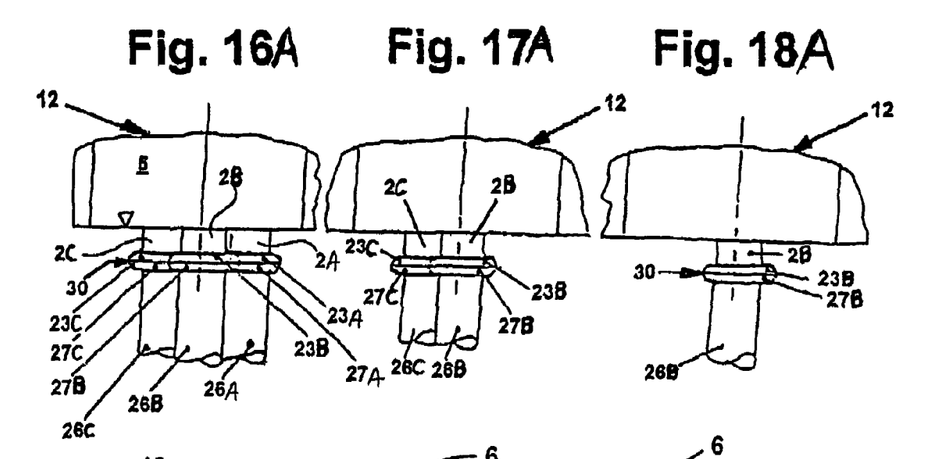
FIG. 16A is a detail portion of FIG. 16 emphasizing the flange connection of the flange-connected pipes.
FIG. 17A is a detail portion of FIG. 17 emphasizing the flange connection of the flange-connected pipes.
FIG. 18A is a detail portion of FIG. 18 emphasizing the flange connection of the flange-connected pipes.
Figures 16B, 17B:
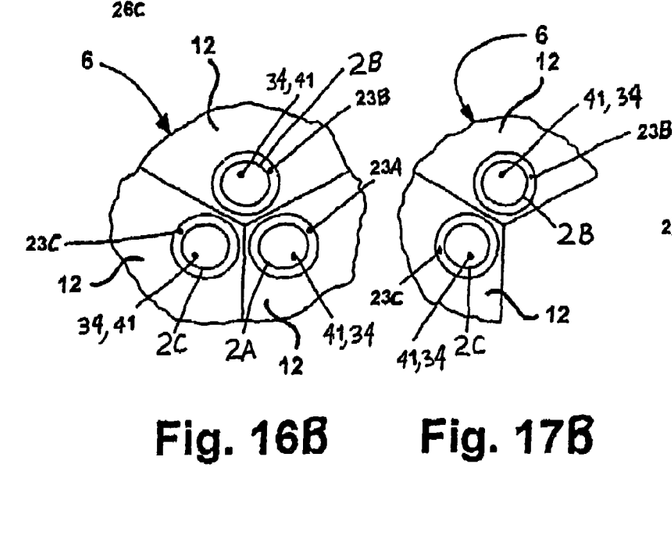
FIG. 16B is a view taken along the section plane XVIB-XVIB in FIG. 16.
FIG. 17B is a view taken along the section plane XVIIB-XVIIB in FIG. 17.
Figure 16C:
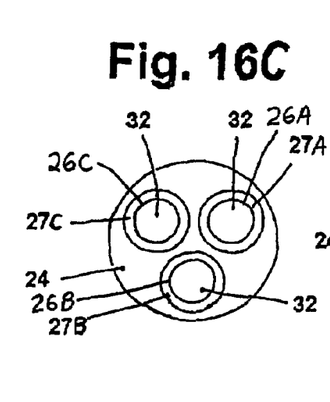
FIG. 16C is a view taken along the section plane XVIC-XVIC in FIG. 16.
Figure 17C:
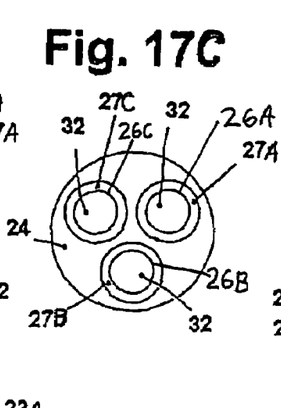
FIG. 17C is a view taken along the section plane XVIIC-XVIIC in FIG. 17.
Figure 18:
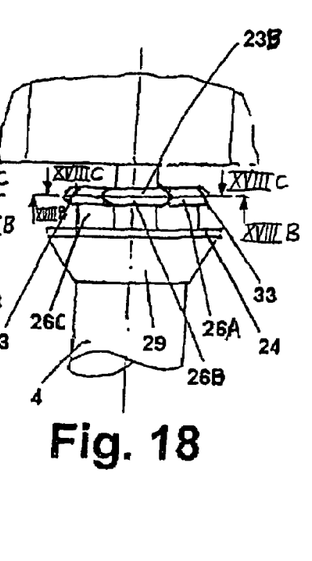
FIG. 18 is a side view similar to that of FIG. 16, but showing an arrangement with only a single one-third-tank connected to the outlet or drain line.

A fifth embodiment of the invention is illustrated in FIGS. 16 to 18 and the associated views of FIGS. 16A, 16B, 16C, 17A, 17B, 17C, 18A, 18B and 18C. The arrangements of FIGS. 16, 17 and 18 respectively include three, two and one one-third-tanks 12 being used as the liquid container(s) 1. These one-third-tanks 12 are arranged around the fictitious upright axis 14 in the manner as described above in connection with FIGS. 5 to 7. The further embodiments according to FIGS. 16, 17 and 18 especially involve a different manner of connecting the respective tanks to the single drain line 4 through further connection elements. This manner of connection according to FIGS. 16 to 18 can be similarly used for any of the above described liquid containers 1, such as the one-half-tanks 11, the one-quarter-tanks 13, the one-third-tanks 12, or the complete cylindrical tanks 19, in any number of tanks in the arrangements described above.

Generally, in this arrangement, the individual one-third-tank 12 is connected to a further or third circular flange 24 by means of a flange connection of flange-connected pipe stubs, which are connected to the drain opening 41 of the respective associated one-third-tank 12. Connected to the bottom or outlet side of the third circular flange 24, there is a funnel or pipe reducer junction 29, with its larger diameter opening connected to the rim of the circular flange 24, and its smaller diameter opening connected with the drain line 4. Such a reducer junction or funnel 29 can also be provided between the second circular flange 10 and the drain line 4 in the above embodiments of FIGS. 2 to 12.

According to FIG. 16, three one-third-tanks 12 are to be connected to the single drain line 4, corresponding to the general arrangement discussed above in connection with FIG. 7. In this example, a first drain stub 2A is connected to the drain opening 41 of a first one of the three installed one-third-tanks 12. A first connection flange 23A is formed on the bottom or free protruding outlet end of this first drain stub 2A. As shown in FIG. 16B, a drain flange opening 34 is let in or cut through the connection flange 23A, and is connected to the first drain stub 2A.

This same manner of connecting to the respective drain opening 41 of a second one-third-tank 12 and a third one-third-tank 12 is also provided for the tank connection using the second and third drain stubs 2B, 2C, which each respectively have a second or third circular drain flange 23B or 23C connected to or integrally formed on the outlet end thereof. Moreover, three further connection openings 25 are provided or let into the face of the third circular flange 24, and three respective pipe-shaped connection stubs 26 are connected to these connection openings 25. Particularly, this arrangement of stubs involves first, second, and third connection stubs 26A, 26B and 26C, whereby the first connection stub 26A has a first connection flange 27A, the second connection stub 26B has a second connection flange 27B, and the third connection stub 26C has a third connection flange 27C formed respectively on the end thereof. Each of these connection flanges 27A, 27B and 27C respectively has a connection flange opening 32 therein, which is connected to the respective associated one of the connection stubs 26A, 26B and 26C, as illustrated in FIG. 16C.

Figure 19:
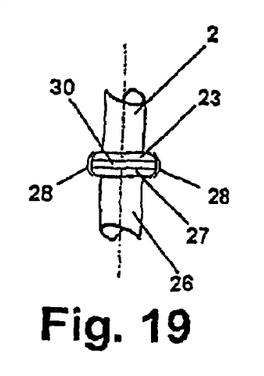
FIG. 19 is a detail partial view of a flange connection of two flange-connected pipe stubs according to a further embodiment feature of the invention.

Since these connection flanges 27A, 27B and 27C are mechanically connected to the drain flanges 23A, 23B and 23C, the position and axial orientation of the pipe axes of the respective drain stubs 2A, 2B and 2C will correspond with those of the connection stubs 26A, 26B and 26C respectively. Preferably, a respective flange seal 30 with a throughhole therein is respectively arranged between the corresponding pairs of the drain flanges 23A, 23B, and 23C and the connection flanges 27A, 27B and 27C that are to be connected to each other as shown in FIG. 19. To carry out the connection, the respective drain stubs and connection stubs are aligned with each other, so that the respective drain flanges and connection flanges are conformingly in registration with one another, with the respective flange seals therebetween, and then a mechanical connection of the joined flanges is carried out. Such a mechanical connection is generally shown in FIG. 19 as an example.

The mechanical flange-connection shown in FIG. 19 relates generally to any drain flange 23 to be coupled to any corresponding connection flange 27, for example the first drain flange 23A to be connected to the first connection flange 27A, for example using a so-called V-clamp or clamping ring or collar 28, which grasps axially over the rims of the two flanges 23 and 27, encircles the circumference of the flange rims, and is then placed under tension with a pre-tensioning force, so as to tightly press together the drain flange 23 and the connection flange 27, with the flange seal 30 therebetween. The clamping pressure exerted by the V-clamp 28 in an axial direction onto the rims or edges of the flanges 23 and 27 exerts a surfacial pressure onto the flange seal 30 between the two flanges 23 and 27, so as to establish a sufficiently tight seal by the flange seal 30.

In this regard, the circumferential rims of the flanges 23 and 27 are somewhat conically tapered, so that the rims of the two flanges 23 and 27 adjoining each other form a combined rim that tapers radially outwardly. The inner sectional configuration of the clamp 28 has a corresponding V-shaped tapering profile groove, that receives and clampingly presses against the tapering rim of the two flanges 23 and 27, so as to exert circumferential, axial, and radial clamping forces to the flanges. The clamp 28 can be configured in the manner of any conventionally known hose clamp or pipe clamp, for example including a tensioning lever, a snap mechanism, a tensioning spring, a worm screw or the like for achieving the necessary circumferential pre-tension of the clamp 28 to be exerted onto the rim of the flanges.

FIG. 16B illustrates the bottom view through the plane XVIB-XVIB of the flange-connection of the arrangement of three tanks 12 shown in FIG. 16. Particularly, FIG. 16B shows the connection of the first, second and third drain stubs 2A, 2B, and 2C to the respective drain openings 41 of the three one-third-tanks 12, with the arrangement of the first, second and third drain flanges 23A, 23B, and 23C with their openings 34 at the free ends of the drain stubs 2A, 2B and 2C.

FIG. 16C illustrates the top view of the arrangement of FIG. 16, along the plane XVIC-XVIC of the flange connection. Particularly, FIG. 16C shows the first, second and third connection stubs 26A, 26B and 26C onto the third circular flange 24, with the first, second and third connection flanges 27A, 27B and 27C with their openings 32 provided on the free ends of the connection stubs 26A, 26B and 26C.

As a further variation based on the tank arrangement of FIG. 6, with the flange connection concept according to FIG. 16, FIG. 17 now illustrates the flange-connection of two one-third-tanks 12 to a single drain line 4. This arrangement of FIG. 17, as well as FIGS. 17A, 17B and 17C, is generally similar to that of FIGS. 16, 16A, 16B and 16C, except that the first tank 12A has been omitted, and therewith, of course also the first drain stub 2A and its drain flange 23A. Instead, the location of the first drain flange 23A in the arrangement according to FIG. 16 has been covered by a blind flange 33, which is connected to and covers or closes the connection flange opening 32 of the first connection flange 27A. This blind flange 33 has a configuration and dimensions the same as the first, second and third drain flanges 23A, 23B and 23C, except that it is a blank flange without any throughhole. This blind flange 33 is mechanically connected to the first connection flange 27A using a V-clamp 28 as described above with regard to the connection of the drain flange 23 to the connection flange 27. Thereby, the drain line or pipe connection provided through the first connection stub 26A extending from the third circular flange 24 is closed and sealed.

Further with regard to FIG. 17, FIG. 17B shows the remaining connection of the second and third drain stubs 2B and 2C to the respective provided drain openings 41 of the second and third one-third-tanks 12, with the second and third drain flanges 23B and 23C with their openings 34 respectively provided at the free ends of the drain stubs 2B and 2C. The view of FIG. 17B is a bottom view along the flange connection plane XVIIB-XVIIB shown in FIG. 17. Note that the blind flange 33 is not illustrated in FIG. 17B, i.e. it has been omitted for simplicity and clarity. The illustration of FIG. 17C corresponds to that according to FIG. 16C, because nothing has changed in the illustrated part of the arrangement. Note that alternatively it would be possible to replace the third circular flange 24 having three connection stubs 26A, 26B and 26C, with a varied circular flange having only two connection stubs and a blank space where the third connection stub would have been. With such an arrangement there would be no need to provide a blind flange 33 to cover and close an unused connection stub 26A.

Figure 18B:
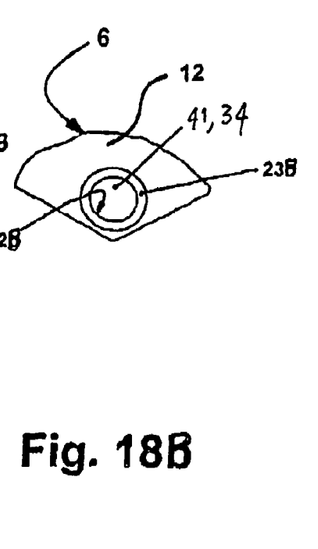
FIG. 18B is a view taken on the section plane XVIIIB-XVIIIB in FIG. 18.
Figure 18C:
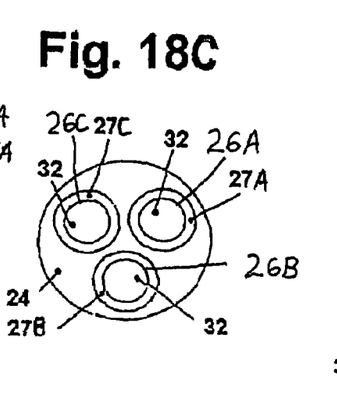
FIG. 18C is a view taken on the section plane XVIIIC-XVIIIC in FIG. 18.

FIG. 18 and its related FIGS. 18A, 18B and 18C show a further variation of the flange connection arrangement according to FIGS. 16 and 17, in which only a single one-third-tank 12 is connected to the single drain line 4, for example in the tank arrangement generally relating to FIG. 5. In comparison to the arrangement of three tanks discussed above in connection with FIG. 16, the single tank arrangement of FIG. 18 omits the first and third drain stubs 2A and 2C and the associated drain flanges 23A and 23C thereof, because the associated first and third tanks 12A and 12C have been omitted. Accordingly, the first and third omitted drain flanges 23A and 23C are replaced by respective blind flanges 33 that are sealed and mechanically connected to the first and third connection flanges 27A and 27C so as to close and cover the first and third connection stubs 26A and 26C. Otherwise, the connection of the remaining single drain stub 2B with its drain flange 23B connected and sealed to the connection flange 27B of the second connection stub 26B is carried out in the same manner as discussed above with regard to FIGS. 16 and 17.

Further with regard to FIG. 18, FIG. 18B shows the bottom view along the flange connection plane XVIIIB-XVIIIB of FIG. 18. Thus, FIG. 18B shows the second drain stub 2B extending from the associated drain opening 41 of the single remaining second one-third-tank 12, with the second drain flange 23B with its opening 34 provided at the free end of this drain stub 2B. The illustration of FIG. 18C corresponds with that of FIG. 16C, because the same circular flange 24 with its three connection stubs 26A, 26B and 26C can remain in use even for the single tank arrangement of FIG. 18. Alternatively, a different circular flange with only a single connection stub could be used.

The mechanical connection of a drain flange 23 to a connection flange 27 using a V-clamp 28 or the like as shown in FIG. 19, can be used together with any of the above discussed embodiments, whereby a simple circular drain flange 23 is mounted, provided or formed on the free outlet end of the selected drain stub 2 (for example instead of a partial flange according to FIGS. 2 to 15), and a circular connection flange 27 is mounted, provided, or formed on the free inlet end of the selected individual connection stub 26. The drain flange 23 has a drain flange opening 34 therein communicating with the drain stub 2, and the connection flange 27 has a connection flange opening 32 therein communicating with the connection stub 26. As discussed above, the circumferential rim of the two flanges 23 and 27 is formed in a tapering V-shape, to cooperate with the V-sectional profile clamp 28. Also, there is a flange seal 30 interposed between the two flanges 23 and 27.

The components and arrangements illustrated and discussed herein in connection with FIGS. 2 to 19 provide an overall building block system for liquid storage tank arrangements that can be variously configured and adapted to different installation conditions and different available installation spaces in the below-deck space of passenger aircraft. In comparison to the conventional installation and arrangement according to FIG. 1, the inventive building block system achieves several advantages and simplifications discussed herein above, and further reduces and simplifies the installation and assembly, and also reduces the variety and number of different parts that are required for assembling different configurations of the system, e.g. including different numbers of liquid storage tanks.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An arrangement for storing and conveying a liquid comprising:
   a first liquid container having an inlet opening and an outlet opening;
   a pipe stub as a first drain stub communicating with and extending from said outlet opening of said liquid container, and terminating with a drain stub flange at a free end of said first drain stub;
   a circular flange having plural connection openings therein, and plural pipe stubs as connection stubs respectively communicating with and extending from said plural connection openings and terminating with respective connection stub flanges at free ends of said connection stubs; and
   a drain line connected to said circular flange and communicating with all of said connection stubs through said connection openings;
   wherein said drain stub flange of said first drain stub is mechanically coupled directly to said connection stub flange of a first one of said connection stubs so as to communicate said first drain stub through said first connection stub to said drain line.

2. The arrangement according to claim 1, wherein said drain stub flange of said first drain stub directly contacts and is mechanically rigidly connected directly to said connection stub flange of said first connection stub with nothing interposed therebetween.

3. The arrangement according to claim 1, further comprising a flange seal with a throughhole therein interposed between said drain stub flange of said first drain stub and said connection stub flange of said first connection stub.

4. The arrangement according to claim 1, wherein said drain stub flange and said connection stub flange respectively have radially outwardly tapering rims, and further comprising a circumferential clamp with a tapered inner groove in which said tapering rims are received, and said circumferential clamp clamps together said tapering rims to thereby mechanically couple said drain stub flange directly to said connection stub flange.

5. The arrangement according to claim 1, wherein said first drain stub and said first connection stub are hollow pipe stubs arranged to directly convey the liquid therein, with inner pipe walls of said pipe stubs in direct contact with the liquid.

6. The arrangement according to claim 1, wherein said pipe stubs are rigid pipe sections.

7. The arrangement according to claim 1, wherein said first drain stub extends straight from said outlet opening along a first drain stub axis, said connection stubs extend straight from said connection openings along respective connection stub axes, and said first drain stub axis of said first drain stub coincides with said connection stub axis of said first connection stub.

8. The arrangement according to claim 1, further comprising:
   a second liquid container having an inlet opening and an outlet opening; and
   a pipe stub as a second drain stub communicating with and extending straight from said outlet opening of said second liquid container along a second drain stub axis;
   wherein said second drain stub is connected straight to a second one of said connection stubs so as to communicate therethrough with said drain line, and wherein said second drain stub axis of said second drain stub coincides with said connection stub axis of said second connection stub.

9. The arrangement according to claim 8, wherein said first drain stub axis extends vertically from said first liquid container to said circular flange, and wherein said second drain stub axis extends vertically from said second liquid container to said circular flange.

10. The arrangement according to claim 9, wherein said first and second liquid containers are each arranged with a respective portion thereof overlapping above said circular flange.

11. The arrangement according to claim 10, wherein said first and second liquid containers each respectively have a sectional configuration of a sector of a circle.

12. The arrangement according to claim 1, wherein said first drain stub axis extends vertically from said first liquid container to said circular flange.

13. The arrangement according to claim 1, wherein said circular flange comprises a circular flange plate with said connection openings therein and said connection stubs connected thereto and extending therefrom, and a conical frustum-shaped hollow funnel having a larger-diameter end connected to a side of said circular flange plate opposite said connection stubs and a smaller-diameter end connected to an inlet end of said drain line and a conical frustum-shaped sidewall extending directly from said larger-diameter end to said smaller-diameter end.

14. The arrangement according to claim 1, further comprising a closed blind flange secured to an open inlet end of an unneeded one of said connection stubs so as to close-off said unneeded one of said connection stubs.

15. An arrangement for storing and conveying a liquid comprising:
   a first liquid container having an inlet opening and an outlet opening;
   a circular flange having plural connection openings therein, and plural pipe-shaped connection stubs respectively communicating with and extending from said plural connection openings;
   a drain line connected to said circular flange and communicating with all of said connection stubs through said connection openings;
   a pipe-shaped first drain stub communicating with and extending from said outlet opening of said liquid container, and connected to a first one of said connection stubs so as to communicate with said drain line through said first connection stub and said connection opening thereof; and
   a closed blind flange secured to an open inlet end of an unneeded second one of said connection stubs so as to close-off said unneeded second one of said connection stubs.

16. The arrangement according to claim 15, wherein said unneeded second connection stub terminates with an unneeded connection stub flange at said open inlet end of said unneeded second connection stub, and said blind flange is secured to said unneeded connection stub flange.

17. The arrangement according to claim 16, wherein said blind flange and said unneeded connection stub flange both have the same diameter, and said blind flange closes-off only and singly said unneeded second connection stub.

* * * * *